United States Patent [19]

Verney et al.

[11] Patent Number: 4,661,710
[45] Date of Patent: Apr. 28, 1987

[54] NEGATIVE ION SOURCE

[75] Inventors: Marthe B. Verney, Paris; Henri J. Doucet, Les Molières, both of France

[73] Assignee: Centre National de la Recherche Scientifique, Paris, France

[21] Appl. No.: 626,242

[22] Filed: Jun. 29, 1984

[30] Foreign Application Priority Data

Jul. 4, 1983 [FR] France ............... 83 11084

[51] Int. Cl.⁴ .............................. H01J 27/02
[52] U.S. Cl. .................. 250/423 R; 250/427; 376/129
[58] Field of Search .............. 250/423 R, 429, 427; 376/129, 130; 315/111.81

[56] References Cited

U.S. PATENT DOCUMENTS

| 4,140,943 | 2/1979 | Ehlers | 315/111.41 |
| 4,447,732 | 5/1984 | Leung et al. | 250/427 |
| 4,486,665 | 12/1984 | Leung et al. | 250/427 |

FOREIGN PATENT DOCUMENTS 0054621 6/1982 European Pat. Off. .

OTHER PUBLICATIONS

K. W. Ehlers et al., "Further Study on a Magnetically Filtered Multicusp Ion Source," Rev. Sci. Insts. 53(9), Sep. 1982, pp. 1423-1428.
Bacal et al., "Extraction of Volume-Produced H⁻ ions," Rev Sci Insts. 56(5), May 1985, pp. 649-654.
Bacal et al. "Progress in Developing a Volume D⁻ Ion Source", Proc. 10th Symposium on Fusion Engineering, Dec. 1983.
Leung et al., Extraction of Volume Produced H⁻ Ions From a Multi-Cusp Source; Rev. Sci. Inst., Jan. 1983.
Leung et al., Optimization of Permanent Magnet Plasma Confinement, Phys. Lett., vol. 51A, No. 8, May 1975.
Article by H. S. McKown et al. published in the Journal of Mass Spectrometry and Ion Physics, vol. 51, No. 1, Jun. 1983.

Primary Examiner—Bruce C. Anderson
Assistant Examiner—Paul A. Guss

[57] ABSTRACT

Negative ion source making it possible to produce an intense beam of negative ions, particularly of hydrogen and deuterium, as well as negative ions of other species. According to the main feature of this negative ion source, the number and distribution of the permanent magnets forming the magnetic multicusp confinement is chosen in such a way that the confinement time of the primary electrons is between $10^{-7}$ and $10^{-6}$ second and the thermionic electron emitters are located in the multicusp magnetic field between the saddle point of the magnetic field, formed by two adjacent permanent magnets and the center of the plasma in the vicinity of said saddle points. It is advantageously applied to the production of high-energy neutral atom beams used e.g. as an effective means for heating plasmas, produced in magnetic confinement fusion means.

11 Claims, 4 Drawing Figures

NEGATIVE ION SOURCE

BACKGROUND OF THE INVENTION

The present invention relates to a negative ion source. It is advantageously applied in the production of high-energy neutral atom beams used e.g. as an effective means for heating to thermonuclear temperatures plasmas produced in magnetic confinement fusion devices.

The atom beams used up to the present have had an energy below 80 keV/nucleon and are produced by accelerating positive ions up to said energy and these ions are then neutralized by collision with the molecules of a gas. However, the efficiency of the neutralization of positive ions drops when the energy thereof is increased.

The heating of plasmas in future nuclear fusion reactors requires atom beams having energy levels above 80 keV/nucleon. The good neutralization efficiency ($>60\%$) of $H^-$ and $D^-$ ions at these high energies makes them more interesting than positive ions for the production of atom beams with an energy above 80 keV/nucleon.

Hitherto, negative deuterium and hydrogen ion sources have been used in different particle accelerators and more particularly in the van de Graaf-tandem accelerator. The current intensities involved were limited to a few dozen microamperes. The methods for producing negative hydrogen or deuterium ions used up to the present in accelerators are as follows:

1. Double electron capture: a beam of positive ions of a few keV is partly converted into negative ions when it passes through an alkali metal vapour or gaseous target (E. B. Hooper, P. Poulsen and P. A. Pincosy, J. Appl. Phys. 52, 7027 (1981).
2. Surface sources: The positive deuterium atoms of a plasma are accelerated to a cesium surface on which they are converted into negative ions (K. Prelec, dans Proc. of the Second Int. Symp. on the Production and Neutralization of Negative Hydrogen Ions and Beams, Oct. 6–10, 1980, BNL Report 51304, 1981, p. 145).
3. Volume sources: Negative ions are extracted from reflex discharges (PIG sources) and peripheral areas of duoplasmatrons (K. Prelec et Th. Sluters, Rev. Sci. Instrum., 44, 1451 (1973).

A large amount of research has dealt with the production of intense sources based on the first two methods. However, the production of the cesium or sodium vapour target, or the cesium surface are linked with very complex problems. Moreover, there is a certain pollution of fusion devices by alkali metals.

The recent discovery of a high production of $H^-$ or $D^-$ negative ions by dissociative detachment to $H_2$ or $D_2$ molecules with a high vibrational excitation and the observation of high negative ion densities in hydrogen and higher deuterium plasmas (M. Bacal, G. W. Hamilton, Phys. Rev. Letters, 42, 1958 (1979)) have led to the suggestion of also extracting $H^-$ or $D^-$ negative ions from multicusp-type plasma generators developed with a view to the production of positive ion beams.

The conventional magnetic multicusp plasma generator used as a positive ion source is characterized by the presence over the entire surface of the plasma, with the exception of the extraction surface, of a multicusp magnetic field produced by permanent magnets confining within the plasma, the high-energy primary electrons emitted by hot filaments made from refractory metals, e.g. tungsten. The conventional magnetic multicusp generator is also characterized by the position of the filaments, which must be located within the plasma and outside the multipolar magnetic field. All these features are quantitatively characterized by the confinement time of the primary electrons, which, in positive ion sources, is made as long as possible.

The negative ion current extracted from a conventional magnetic multicusp plasma generator is small compared with the positive ion current (0.8%).

K. N. Leung, K. W. Ehlers and M. Bacal have proposed (cf Rev. Sci. Instrum., 54, 56, 1983) the introduction into the multicusp of a "magnetic filter" for increasing the extracted negative ion current. The "magnetic filter" consists of a system of permanent magnet bars, each inserted into a copper tube, through which water is circulated to prevent the heating of the magnets which lead, to their demagnetization. The maximum current density of the negative ions extracted from this plasma generator is limited to densities of approximately 0.1 $mA/cm^2/A$ of discharge current.

SUMMARY OF THE INVENTION

The object of the invention is to obviate these disadvantages by providing a negative ion source making it possible to produce an intense beam of negative ions, particularly hydrogen and deuterium, as well as negative ions of other species.

The present invention therefore specifically relates to a negative ion source having a gas or vapour plasma generator comprising:

a magnetic multicusp confinement configuration realised by permanent magnets surrounding the plasma, thermionic electron emitters producing primary electrons made energetic by a potential difference applied between the thermoionic emitters and the generator anode and sufficient for fulfilling two functions: namely ionizing the gas or vapour for forming the plasma and exciting the molecules of the gas to high vibrational levels, whilst in this way aiding the production of negative ions by dissociative attachment of the slow electrons of the plasma to the excited molecules and also having:

a negative ion extraction system, wherein:

the number and distribution of the permanent magnets forming the magnetic multicusp confinement is chosen in such a way that the confinement time of the primary electrons is between $10^{-7}$ and $10^{-6}$ second, and wherein the thermoionic electron emitters are located in the multicusp magnetic field between the "saddle point" of the magnetic field, formed by two adjacent permanent magnets, and the centre of the plasma, in the vicinity of said "necks".

According to another feature of the ion source according to my invention, any surface exposed to the plasma of the generator, with the exception of that of the thermoionic electron emitters, is made from a material able to reduce the deexcitation of the vibrationally excited molecules.

According to a preferred embodiment of an ion source according to the invention, the plasma generator comprises a cylindrical enclosure and, on the outer cylindrical surface thereof only, is distributed an even number of equidistant permanet magnets, oriented alternately with the north and south poles towards the plasma.

According to a preferred embodiment of an ion source according to the invention, a system consisting of several ion sources is placed in a single enclosure.

According to another preferred embodiment of an ion source according to the invention, the permanet magnets are placed on the generatrixes of the cylindrical surface surrounding the plasma.

According to yet another preferred embodiment of an ion source according to the invention, the permanent magnets are located on the circumferences of the cylindrical surface surrounding the plasma.

According to another feature of the ion source according to the invention, the magnetic induction produced by part of the group of permanent magnets exceeds the magnetic induction produced by the remainder of the permanent magnets.

According to yet another feature of the ion source according to the invention, the radial component of the magnetic induction decreases for a value between 500 and 1500 Gauss on the surface of the plasma in the vicinity of the magnets to a value of approximatley 5 Gauss at 5 cm therefrom, in the direction of the centre of the plasma.

According to yet another feature of the ion source according to the invention, each column of permanent magnets is associated with a certain number of thermionic electron emitters disposed in the vicinity of the periphery of the plasma.

According to another feature of the ion source according to the invention, the thermionic electron emitters are located within a cylindrical surface passing through all the saddle points of the magnetic field produced by the configuration of the permanent magnets in radial planes located between two adjacent magnets and equidistant of each of them, in an azimuthal magnetic field of a few tens of Gauss.

According to yet another feature of the ion source according to the invention, the material for forming the plasma is chosen in the group including hydrogen, deuterium, tritium, oxygen, sodium, lithium, silane and iodine.

The ion source according to the invention can be used with any random gas or vapour able to produce negative ions by dissociative attachment. However, it is particularly useful for gases, whose negative ion production increases when the molecules are vibrationally excited, such as the aforementioned gases.

According to another feature of the ion source according to the invention, a magnetic filter comprising permanent magnet bars is installed within the plasma. This magnetic filter is installed upstream of the extraction system in order to confine the primary electrons in that part of the generator containing the thermoionic electron emitters.

According to yet another feature of the ion source according to the invention, a magnetic filter produced by inverting the orientation of one of the magnet bars producing the multicusp magnetic confinement is installed upstream of the extraction system, in order to confine the primary electrons in that part of the generator containing the thermoionic electron emitters.

According to yet another characteristic of the ion source according to the invention, when the gas for forming the plasma is hydrogen, the pressure in the ion source is chosen between 0.5 and 5 millitorr in order to optimize the current of extracted negative ions.

Finally, according to another feature of the ion source according to the invention, the plasma generator comprises an enclosure closed at one end by a flange and at the other end by a plate, and the extraction of negative ions takes place by means of one or more openings in the plate, the potential of said plate being between 0 and +5 V with respect to the enclosure and the flange, in order to optimize the current of extracted negative ions and reduce the current of extracted electrons.

BRIEF DESCRIPTION OF THE DRAWINGS

The invention is described in greater detail hereinafter relative to a non-limitative embodiment of a negative ion source and with reference to the attached drawings, wherein show.

DETAILED DESCRIPTION OF THE PERFERRED EMBODIMENT

Figure 1:
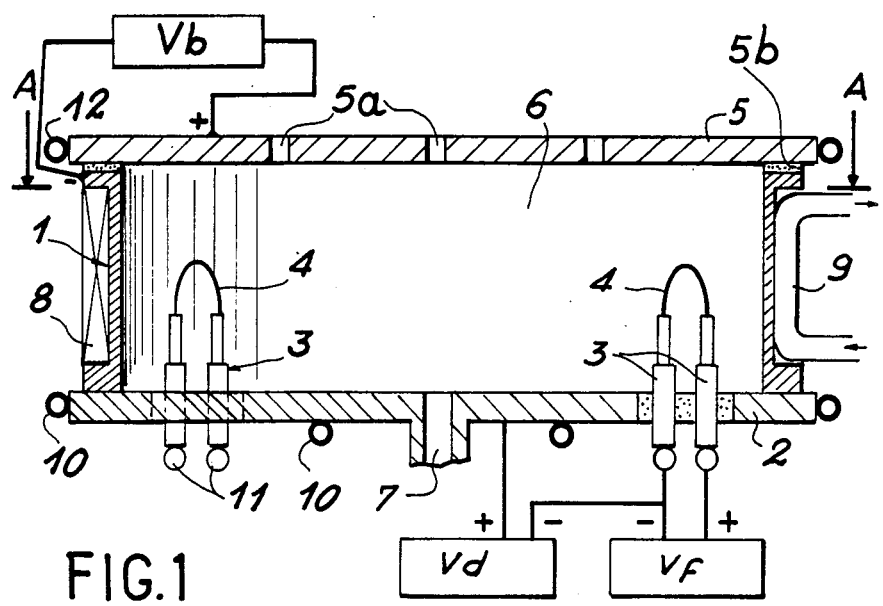
FIG. 1 diagrammatically a preferred embodiment of a negative ion source according to the invention, in a cross-section along the central axis.

FIG. 1 shows a preferred embodiment of a negative ion source according to the invention. The plasma generator comprises a cylindrical enclosure 1 made from a material having the property of reducing the deexcitation of vibrationally excited molecules. Stainless steel is particularly suitable, but other alloys having the same surface properties with respect to the deexcitation of vibrationally excited molecules can also be used. It is pointed out that copper is particularly poor.

This cylindrical enclosure is closed at one end by a flange 2 having several insulated passages 3 for the filaments 4 representing the thermionic electron emitters and at the second end by an insulated plate 5, ion extraction taking place through one or more openings 5a therein.

The assembly of cylindrical enclosure 1, flange 2 and plate 5 forms the anode of the plasma generator and defines the chamber 6 in which the plasma is produced. An opening 7 in the centre of flange 2 is connected to a valve (not shown in FIG. 1) by which gases such as hydrogen and its isotopes, oxygen or other gases and vapours can be continuously introduced into chamber 6.

Figure 2:
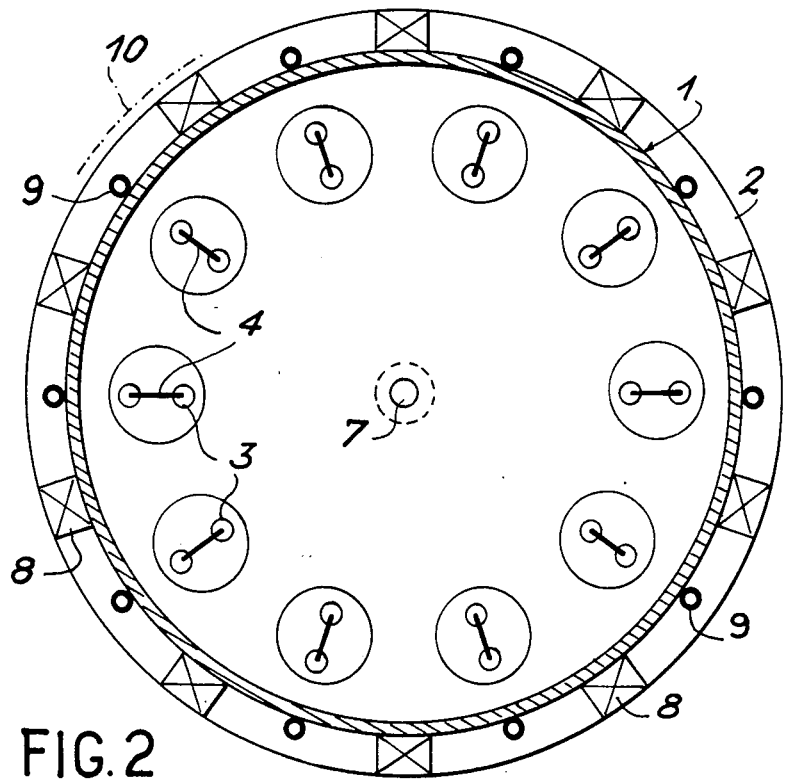
FIG. 2 diagrammatically and in section the arrangement of the permanent magnet columns.

The multicusp magnetic field is produced by an even number of permanent magnet columns 8, which are applied to the outer surface of cylindrical enclosure 1, in the manner shown in FIG. 2. The permanent magnets have a rectangular cross-section (2×1 cm) and a length equal to that of enclosure 1. They are magnetized in the direction perpendicular to the face with the width 2 cm. The magnetic field on the surface of the magnets is 1500 Gauss. The multicusp magnetic field is produced by orienting the permanent magnet columns 8 alternately with north and south poles towards the plasma, with the 2 cm face applied along the generatrix of the cylindrical enclosure 1. The number of pairs of magnets and the distance between two adjacent magnets are chosen in such a way that the maximum radial component of the magnetic field, close to the inner surface of enclosure 1, at the location of a "cusp", is three to four times greater than the azimuthal component of the magnetic field at saddle point 13 (i.e. the maximum vlaue of the azimuthal component between two cusps). For a cylindrical enclosure with a diameter of 26 cm, ten permanent columns are used having a width of 2 cm and a surface field of 1500 Gauss. The maximum radial component of the magnetic field within the enclosure is 500 Gauss and the thickness of the enclosure wall is 3 mm.

In another construction, it is possible to use 10 permanent magnet columns with a width of 0.9 cm and a surface field of 3500 Gauss, the maximum radial component of the magnetic field within the enclsoure being 1500 Gauss.

A certain number of cooling tubes 9 equal to the number of magnet columns (ten in this embodiment) are welded along generatrixes of the cylindrical enclosure with an equal distance between two magnets. Flange 2, current passages 3 and plate 5 are also cooled by the circulation of a fluid through cooling tubes 10, 11, 12 respectively.

Figure 3A:
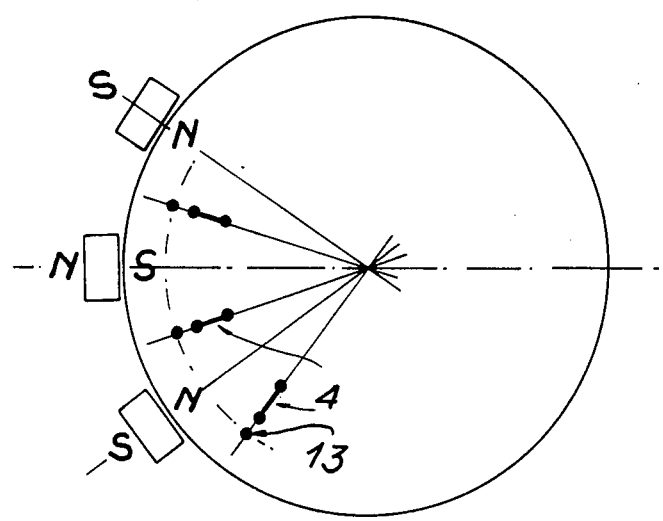
FIGS. 3a and 3b, diagrammatically, different possible positions of the thermionic electron emitters.
Figure 3B:
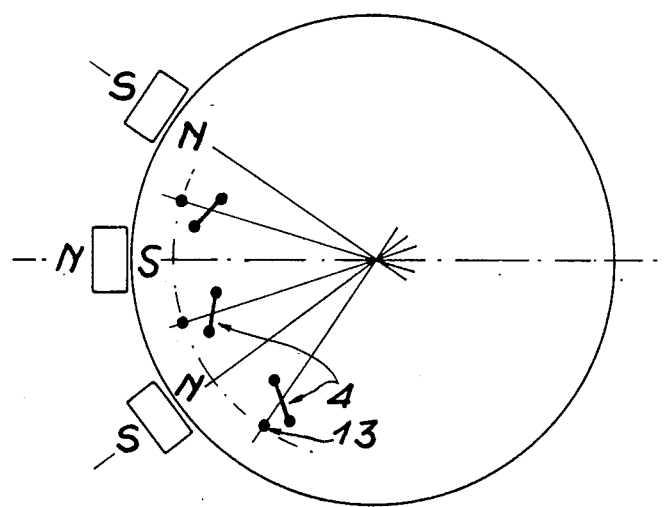

The same number of thermionic electron emitters as there are permanent magnet columns are positioned on the periphery of chamber 6. The thermoionic emitters are thoriated tungsten or tungsten wire U-shaped filaments. The centre of each filament is located in the radial plane passing through the "saddle point" 13 of the magnetic field (i.e. the plane positioned equidistantly between two adjacent magnets). It is important that each filament is located within the cylinder passing through all the saddle points 13 and also that it is located in a magnetic field of a few tens of Gauss. In the aforementioned device, the magnetic field saddle point is 2 cm from the wall enclosure 1 and the centre of the filament is at 3.5 cm from the said wall. The orientation of the filaments along the radius indicated in FIGS. 1 and 2 is not essential. FIGS. 3a and 3b diagrammatically show two possible positions of the thermionic electron emitters. The position indicated in FIG. 3a gives better results than that indicated in FIG. 3b.

Filaments 4 are mounted on insulated current passages 3. All the metal parts of the current passages 3 are covered with a ceramic tube. The length of the filaments and their distance from flange 2 are chosen in such a way that the tip of the U-shaped filaments is mid-distance between flange 2 and plate 5, said distance being 25 cm.

Plate 5 is insulated from enclosure 1 by an insulant 5b and must be positively polarized between 0 and 5 V (with the aid of a power supply $V_b$) relative to enclosure 1 and flange 2, which are electrically connected.

The filaments are continuously negatively polarized by a few dozen volts with respect to the enclosure 1 by means of power supply $V_d$. The filaments are continuously heated with the aid of another power supply $V_f$.

Apart from plate 5, the extraction system has, around the extraction openings 5a, a magnetic field produced by permanent magnets or any other means preventing the electrons from the plasma passing into the extractor.

It has been stated hereinbefore that the permanent magnets are solely located on the outer cylindrical surface of enclosure 1. More generally, in order to obtain a primary electron confinement time between $10^{-7}$ and $10^{-6}$ seconds, it is sufficient if only a significant part of the complete anode surface of the generator is not covered with permanent magnets.

What is claimed is:

1. A negative ion source having a gas or vapour plasma generator comprising:

a magnetic multicusp confinement configuration realized by permanent magnets surrounding the plasma, thermionic electron emitters producing primary electrons made energetic by a potential difference applied between the thermionic emitters and the generator anode and sufficient for fulfilling two functions: namely ionizing the gas or vapour for forming the plasma and exciting the molecules of the gas to high vibrational levels, whilst in this way aiding the production of negative ions by dissociative attachment of the slow electrons of the plasma to the excited molecules and also having:

a negative ion extraction system, wherein:

the number and distribution of the permanent magnets forming the magnetic multicusp confinement is chosen in such a way that the confinement time of the primary electrons is between $10^{-7}$ and $10^{-6}$ second, and wherein the thermionic electron emitters are located in the multicusp magnetic field between the saddle point of the magnetic field, formed by two adjacent permanent magnets and the centre of the plasma, in the vicinity of said saddle points.

2. A negative ion source according to claim 1, wherein any surface exposed to the plasma of the generator, with the exception of that of the thermionic electron emitters is made from a material having the property of reducing the deexcitation of vibrationally excited molecules.

3. A negative ion source according to claim 1, wherein the plasma generator comprises a cylindrical enclosure and wherein, on the outer cylindrical surface thereof only, is distributed an even number of equidistant permanent magnets, which are oriented alternately with the north and south poles towards the plasma.

4. A negative ion source according to claim 1, wherein the permanent magnets are located on the generatrizes of the cylindrical surface surrounding the plasma.

5. A negative ion source according to claim 1, wherein the permanent magnets are located on the circumferences of the cylindrical surface surrounding the plasma.

6. A negative ion source according to claim 1, wherein the radial component of the magnetic induction decreases from a value between 500 and 1500 Gauss on the surface of the plasma in the vicinity of the magnets to a value of approximately 5 Gauss 5 cm therefrom, in the direction of the centre of the plasma.

7. A negative ion source according to claim 1, wherein each column of permanent magnets is associated with a certain number of thermoionic electron emitters disposed in the vicinity of the periphery of the plasma.

8. A negative ion source according to claim 7, wherein the thermionic electron emitters are located within a cylindrical surface passing through all the saddle points of the magnetic field produced by the configuration of the permanent magnets in a plane located between two adjacent magnets and equidistant of each of them in an azimuthal magnetic field of a few tens Gauss.

9. A negative ion source according to claim 1, wherein the material for forming the plasma is chosen from the group including hydrogen, deuterium, tritium, oxygen, sodium, lithium, silane and iodine.

10. A negative ion source according to claim 1, wherein, when the gas for forming the plasma is hydrogen, the pressure in the ion source is chosen between 0.5 and 5 millitorr in order to optimize the extracted negative ion current.

11. A negative ion source according to claim 1, wherein the plasma generator comprises an enclosure closed at one end by a a flange and at the other end by a plate, and wherein the extraction of negative ions takes place by means of one or more openings in the plate, the potential of said plate being between 0 and +5 V with respect to the enclosure and the flange, in order to optimize the current of extracted negative ions and reduce the current of extracted electrons.

* * * * *